United States Patent [19]

Aizawa et al.

[11] Patent Number: 5,239,436
[45] Date of Patent: Aug. 24, 1993

[54] TAPE CARTRIDGE WITH INCREASED TAPE CAPACITY

[75] Inventors: Taizo Aizawa; Osamu Koizumi; Kengo Saito; Takayasu Hirano, all of Miyagi, Japan

[73] Assignee: Sony Corporation, Tokyo, Japan

[21] Appl. No.: 799,307

[22] Filed: Nov. 27, 1991

[30] Foreign Application Priority Data

Dec. 7, 1990 [JP] Japan .................. 2-400760

[51] Int. Cl.⁵ .................. G11B 23/087; G11B 15/32
[52] U.S. Cl. .................. 360/132; 242/192; 360/96.1
[58] Field of Search .......... 360/96.1, 94, 132; 242/192, 199

[56] References Cited

U.S. PATENT DOCUMENTS

| | | | |
|---|---|---|---|
| 4,262,860 | 4/1981 | Hurtig et al. .................. | 360/96.1 |
| 5,019,933 | 5/1991 | Karsh .................. | 360/132 |

FOREIGN PATENT DOCUMENTS

| | | | |
|---|---|---|---|
| 3509583 | 9/1986 | Fed. Rep. of Germany ..... | 360/96.1 |
| 1-42088 | 2/1989 | Japan .................. | 360/132 |
| 658330 | 10/1986 | Switzerland .................. | 360/96.1 |
| 1642519 | 4/1991 | U.S.S.R. .................. | 360/96.1 |

Primary Examiner—John H. Wolff
Attorney, Agent, or Firm—William S. Frommer; Alvin Sinderbrand

[57] ABSTRACT

An improved tape cartridge with increased tape capacity comprises a cartidge housing including a base plate which has two portions. The two portions connect with each other to form at least one corner portion. At least one guide is located adjacent the one corner portion such that the tape web is held out of interference with the one corner portion. A driven roller is positioned such that a straight line drawn through the driven roller passes between axes of rotation of two tape packs mounted on the base plate and extends perpendicular with a straight line extending through the axes of rotation of the tape packs.

5 Claims, 1 Drawing Sheet

TAPE CARTRIDGE WITH INCREASED TAPE CAPACITY

BACKGROUND OF THE INVENTION

The present invention relates to a tape cartridge with increased tape capacity.

U.S. Pat. No. 4,262,860 discloses an improved tape cartridge with length dimension significantly greater than prior art cartridges of similar application. Two tape packs and a drive belt are disposed in a cartridge housing to permit tape packs having increased tape capacity. The cartridge housing is so designed as to interfere with a tape cartridge drive and has a front planar face with an opening for receiving a recording-/reproducing head. This housing has a substantially rectangular base plate which is substantially perpendicular to the front face. The two tape packs, namely a first tape pack and a second tape pack are rotatably mounted in the housing about a first and second fixed axes of rotation, respectively. The first axis of rotation is aligned laterally relative to the second axis of rotation with a straight line projecting through the first and second axes of rotation intersecting the plane of the front face at an acute angle. Alternatively, the second axis of rotation is located intermediate the first axis of rotation and the plane of the front face along a line segment extending parallel to the base plate passing through the first axis of rotation and the plane of the front face. The drive belt is an endless belt of a flexible elastic material. The belt is wrapped over a plurality of rollers which include a driven roller adapted to contact a driving roller of a tape drive when the tape cartridge is inserted into the tape drive. According to this known tape cartridge, since width of the rectangular base plate is determined by the design of the tape drive, the maximum diameter of a tape pack which can be arranged in the housing is limited by the width of the base plate even if the length of the base plate is increased.

An object of the present invention is to provide a tape cartridge which permits tape packs of significantly increased capacity that is not limited by the design of the tape drive.

A specific object of the present invention is to provide a mirror image cartridge of the above character which permits tape packs of significantly increased capacity and which is not limited by the design of the tape drive.

SUMMARY OF THE INVENTION

According to the present invention, there is provided a tape cartridge comprising:

a cartridge housing having a base plate, said base plate including a first portion set aside as a tape pack mounting portion and a second portion, said second portion being formed with an opening;

a first tape pack and a second tape pack, the first and second tape packs each rotatably mounted in said cartridge housing about a first axis of rotation and a second axis of rotation, respectively, with a tape web attached at one end to said first tape pack and at the other end to the second tape pack, said first and second tape packs being located within said first portion;

a plurality of guides mounted to said cartridge housing and positioned to guide said tape web when moving intermediate said first and second tape packs and past said opening, said plurality of guides including a first guide and a second guide which are located within said second portion of said base plate such that a straight line drawn through said first and second guides passes through said opening;

an endless drive belt constructed of a flexible elastic material;

a plurality of rollers over which said drive belt is wrapped, said rollers being positioned such that said drive belt forms at least two arcuate portions passing between and engaging said first and second tape packs, said plurality of rollers including a driven roller located within said second portion;

wherein said second portion of said base plate connects with said first portion to form at least one corner portion;

said plurality of guides include a third guide located adjacent said one corner portion such that said tape web is held out of interference with said one corner portion; and said driven roller of said plurality of rollers is positioned such that a first straight line drawn through said driven roller passes between said first and second axes of rotation and extends perpendicular with a second straight line extending through said first and second axes of rotation.

A specific aspect of the present invention is that said first portion of said base plate cooperates with said second portion to form, in addition to said one corner portion, another corner portion.

A further specific aspect of the present invention is that said first portion of said base plate extends between said one and another corner portions, while said second portion of said base plate extends further beyond said one and another corner portions.

A still further aspect of the present invention is that said plurality of guides include, in addition to said third guide, a fourth guide located adjacent said another corner portion.

A still further aspect of the present invention is that said first and second axes of rotation are spaced equidistant from said first straight line.

DETAILED DESCRIPTION OF THE INVENTION

Figure 1:
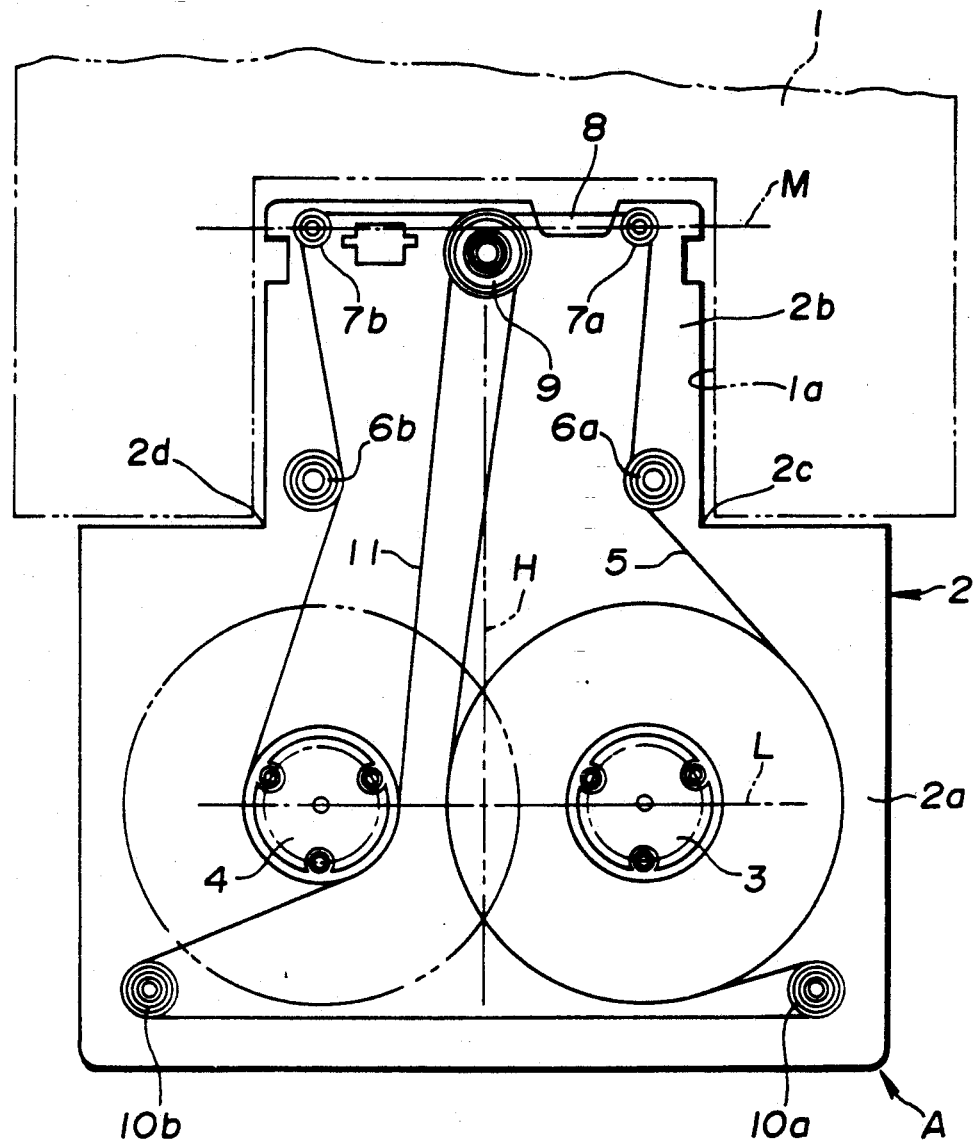
FIG. 1 is a plan view of a tape cartridge with a tape drive shown in phantom.

Referring to the drawing, a tape drive 1 has an opening 1a in which a front end portion of a tape cartridge A is inserted. The tape cartridge A includes a cartridge housing 2 having a metal base plate and a plastic case covering the base plate. The base plate of the cartridge housing 2 includes a first portion 2a having a relatively large area and a second portion 2b extending with a relatively small area from the first portion. The first portion 2a serves as a tape pack mounting portion while the second portion 2b is adapted to be received into the tape drive 1 when the tape cartridge A is seated within the tape drive 1. The second portion 2b connects with the first portion 2a to form opposite corner portions 2c and 2d. In this embodiment, each of the corner portions 2c and 2d makes a right angle as shown in FIG. 1 though not limited thereto. The second portion 2b is provided with an opening 8 into which a tape recording/reproducing head (not shown) is accomodated upon insertion of the tape cartridge A into the tape drive 1.

A pair of tape packs 3 and 4 are rotatably mounted in the first portion 2a about axes of rotation, respectively, with a tape web 5 which is attached at one end to the tape pack 3 and at the other end to the tape pack 4.

A pair of guides 7a and 7b are located within the second portion 2b of the base plate such that a straight line M drawn through the guides 7a and 7b passes through the opening 8. Another pair of guides 6a and 6b are located adjacent the corner portions 2c and 2d such that the tape web 5 is held out of interference with the corner portions 2c and 2d of the base plate. Due to this arrangement of these guides 6a, 6b, 7a and 7b, the tape web 5 is guided when moving intermediate the tape packs 3 and 4 and past the opening 8.

A driven roller 9 is located within the second portion 2b of the base plate such that a straight line H drawn through the driven roller 9 passes between the axes of rotation of the tape packs 3 and 4 and extends perpendicular with a straight line L extending through the axes of rotation thereof. The axes of rotation of the tape packs 3 and 4 may be spaced equidistant from the straight line H. When the cartridge A is inserted into the opening 1a of the tape drive 1, the driven roller 9 is contacted with a drive roller (not shown) of the tape drive 1 and driven thereby. Two idle rollers 10a and 10b are located within the first portion 2a of the base plate so as to be spaced at a longer distance than that between the axes of rotation of the tape packs 3 and 4.

An endless drive belt 11 constructed of a flexible elastic material is wrapped over the driven roller 9 and the idle rollers 10a and 10b. The drive belt 11 forms two arcuate portions passing between and engaging the tape packs 3 and 4.

Upon insertion of the cartridge A into the opening 1a of the tape drive 1, the tape recording and reproducing head of the tape drive 1 contacts the tape web 5 in the opening 8. When the driven roller 9 starts to rotate by contacting the drive roller of the tape drive 1, the drive belt 11 moves over the rollers 9, 10a and 10b. The rotation movement of the driven roller 9 is imparted to the tape web 5 and in turn the tape packs 3 and 4 via the belt 11 wrapped about the rollers 9, 10a and 10b. The belt 11 tensions the tape web 5 through the arcuate portions so that the tape web 5 moves in a direction of movement of the drive belt 11. Since a friction is exerted through a length of the arcuate portion, the tape packs 3 and 4 are allowed to have a rotating force sufficient to rotate the tape web 5 around the axes of rotation. Thus the tape web 5 travels from the tape pack 3 to the tape pack 4 and vice versa.

During the rotation, the tape web 5 is tensioned by contact with the arcuate portions of the drive belt 11 and the tension varies according to change in the respective rotating forces exerted thereon.

The length of the arcuate portion of the drive belt 11 is minimum when a diameter of the tape pack 4 is smallest as shown in a solid line of FIG. 1. On the other hand, when the diameter of the tape pack 4 is largest, the length is maximum as shown in a phantom line of FIG. 1. A difference between the minimum and maximum lengths of the arcuate portions of the drive belt 11 is relatively small. Accordingly, a difference in the tension exerted on the tape web 5 is also limited to small. Owing to the small tension difference, an abrasion of the tape recording/reproducing head caused by the tension upon tape winding, specially upon fast winding for forward- or reverse-play, is restrained to a small extent, resulting in an improvement in durability of the head.

It will now be appreciated that the tape cartridge according to the present invention has a significantly increased tape storage capacity that is not limited by the design of the tape drive.

Further, in the arrangement of the components of the tape cartridge according to the invention, the optional number of the idle rollers may be employed.

What is claimed is:

1. A tape cartridge for use with a tape drive having a recording/reproducing head and a tape cartridge reception opening with a predetermined width, said tape cartridge comprising:

a tape;

a cartridge housing including a first portion having a width which is substantially larger than said predetermined width of said reception opening of said tape drive and a second portion having a head opening for providing access to said tape for said recording/reproducing head and having a width which is slightly less than said predetermined width of said opening of said tape drive so as to permit substantially complete insertion of said second portion into said opening of said tape drive, said second portion being contiguous to said first portion so as to form at least one corner therebetween;

first and second tape packs rotatably mounted in said first portion of said cartridge housing for rotation about first and second axes, respectively, one end of said tape being attached to said first tape pack and the other end of said tape being attached to said second tape pack;

a plurality of guides mounted in said cartridge housing and positioned to guide said tape between said first and second tape packs in a path extending past said head opening, said plurality of guides including first and second guides located within said second portion of said housing such that a first straight line drawn through said first and second guides passes adjacent said head opening and a third guide located adjacent to said one corner so as to prevent said tape from contacting an inside portion of the respective corner;

a plurality of rollers including a driven roller located within said second portion and positioned such that a second straight line passing through said driven roller and between said first and second axes of rotation is perpendicular with a third straight line passing through said first and second axes of rotation; and a flexible drive belt wrapped around said plurality of rollers and said first and second tape packs so as to drivingly engage said tape packs at respective arcuate portion of the drive belt.

2. A tape cartridge as in claim 1, wherein another corner is formed between said first and second portions of said housing.

3. A tape cartridge as in claim 2, wherein the width of said second portion of said housing extends between said one corner and said other corner, and the width of said first portion of said housing extends beyond said one corner and said other corner.

4. A tape cartridge as in claim 3, wherein said plurality of guides further include a fourth guide located adjacent to said other corner so as to prevent contact of said tape with an inside portion of said other corner.

5. A tape cartridge as in claim 4, wherein said first and second axes of rotation are spaced equidistant from said second straight line.

* * * * *